United States Patent [19]

Chandler

[11] 4,433,961

[45] * Feb. 28, 1984

[54] HUMAN KNEE MODEL SUITABLE FOR TEACHING OPERATIVE ARTHROSCOPY AND HAVING REPLACEABLE JOINT

[76] Inventor: Eugene J. Chandler, 5702 E. Camelback Rd., Phoenix, Ariz. 85018

[*] Notice: The portion of the term of this patent subsequent to May 25, 1999 has been disclaimed.

[21] Appl. No.: 366,474

[22] Filed: Apr. 8, 1982

Related U.S. Application Data

[63] Continuation-in-part of Ser. No. 187,509, Sep. 15, 1980, Pat. No. 4,331,428.

[51] Int. Cl.$^3$ .............................................. G09B 23/30
[52] U.S. Cl. .................................................. 434/274
[58] Field of Search ............... 434/262, 267, 274, 275, 434/295

[56] References Cited

U.S. PATENT DOCUMENTS 2,988,823 6/1961 Rosenbloom ................... 434/274 X
4,331,428 5/1982 Chandler ............................ 434/274

OTHER PUBLICATIONS

Clay–Adams Co., 1953 Catalog, pp. 180, 181, 182 only showing conventional articulated and disarticulated skeletons and parts.

*Primary Examiner*—Harland S. Skogquist
*Attorney, Agent, or Firm*—Cahill, Sutton & Thomas

[57] ABSTRACT

A method of providing a human knee model suitable for teaching operative arthroscopy includes the steps of modifying a bovine knee to render its appearance more human-like and to facilitate access to the interior of the knee joint, and encasing the modified knee joint with a synthetic fluid-impervious cover to allow for continuous irrigation of the knee joint. Lesions are created in the menisci of the knee, and loose bodies are added to the knee joint to simulate various injuries. To facilitate convenient replacement of the natural portion of the knee model, the bovine knee joint may be severed from the bovine femur and tibia bones closely adjacent the knee joint, and the thus severed knee joint may then be releasably secured to the lower and upper ends of synthetic, human-like femur and tibia bones, respectively. A synthetic patella includes a synthetic patellar ligament secured to the synthetic tibia bone and also includes a synthetic quadriceps tendon slidingly secured to the synthetic femur bone for allowing the knee joint to be flexed.

34 Claims, 24 Drawing Figures

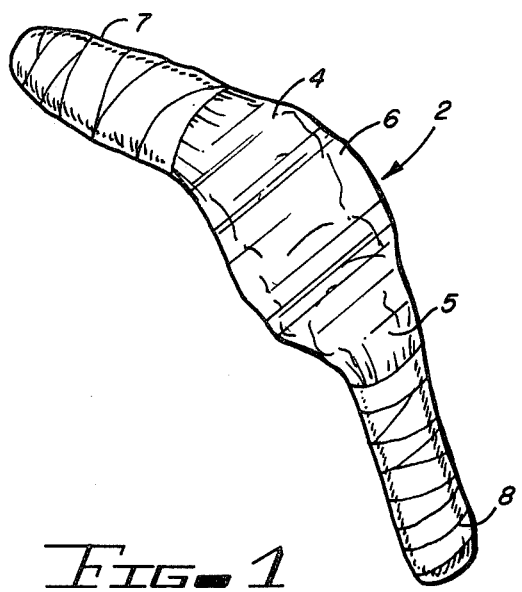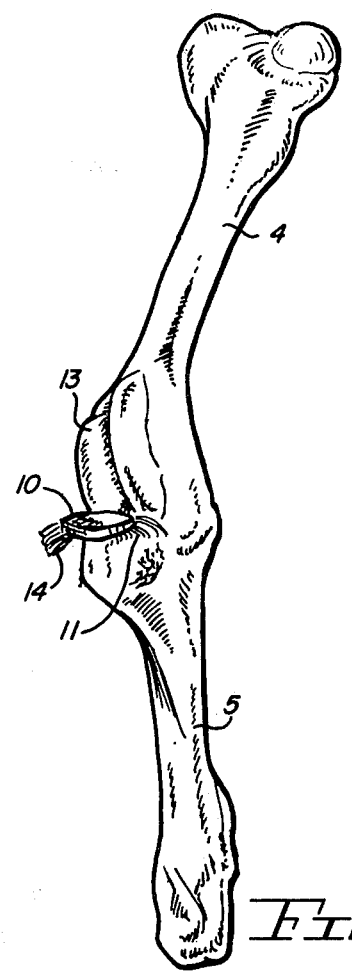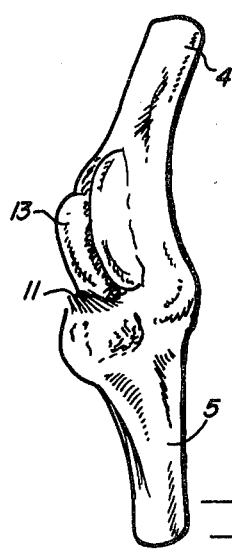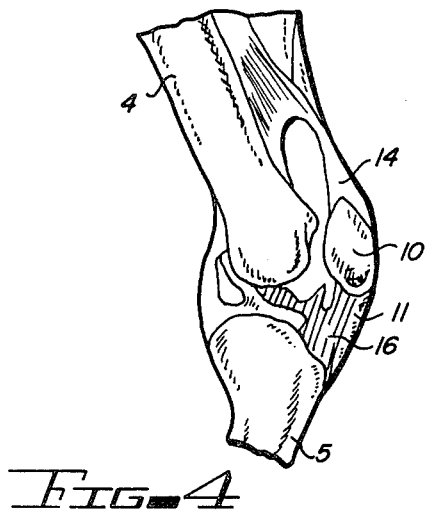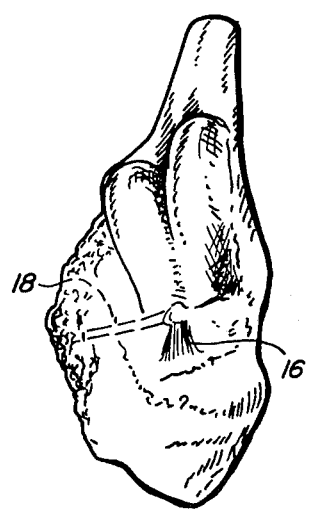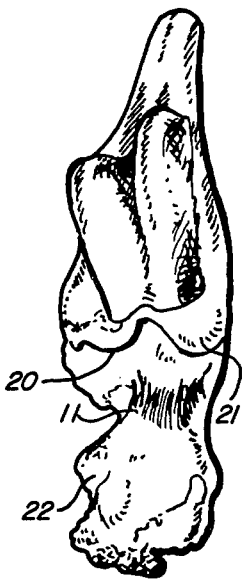

HUMAN KNEE MODEL SUITABLE FOR TEACHING OPERATIVE ARTHROSCOPY AND HAVING REPLACEABLE JOINT

CROSS-REFERENCE TO RELATED APPLICATION

The present application is a continuation-in-part of co-pending patent application Ser. No. 187,509, filed on Sept. 15, 1980, now U.S. Pat. No. 4,331,428, issued May 25, 1982.

BACKGROUND OF THE INVENTION

1. Field of the Invention

The present invention relates generally to models of the human knee joint, and more particularly, to a method of providing a human knee model suitable for teaching arthroscopic surgical technique.

2. Description of the Prior Art

Arthroscopy was initially developed in Japan approximately 40 years ago. However, only recently has arthroscopic surgery become widely recognized as being vastly superior to traditional methods of surgery involving joints of the human body, particularly the knee joint. Arthroscopic knee surgery is typically performed through three small one-quarter inch incisions while the patient is under general anesthesia. A fiber optic telescope or arthroscope, smaller than the size of a pencil, is inserted into the knee for allowing the surgeon to thoroughly examine all parts of the knee joint. A small television camera may be attached to the arthroscope, and the magnified image of the inside of the knee joint is displayed on a television screen. After the injury to the knee joint has been defined precisely, small delicate instruments are inserted through one of the other small incisions, and the damaged portion of the knee joint is repaired or corrected. The small incisions avoid the large scars of a conventional open surgical operation and shorten the patient's recovery time while reducing postoperative pain.

Operative arthroscopy of the knee demands that the surgeon learn new psychomotor skills. The surgeon must be able to manipulate the arthroscope, inserted within a first small incision, for locating the area of the knee joint to be viewed while simultaneously manipulating a delicate instrument, inserted within a second small incision, in order to direct the tip of the instrument toward the highly magnified area of the knee viewed by the arthroscope. Thus, the surgeon must develop new eye-brain and eye-hand stereotaxis to successfully perform operative arthroscopy.

Resident surgeons usually learn surgical technique within the operating room through observation of a highly skilled surgeon. Unfortunately, this traditional method of training through observation does not lend itself to learning and developing the psychomotor skills required for arthroscopic surgery. In view of the relatively large number of surgeons expressing an interest in learning arthroscopic surgical technique, individualized training of interested surgeons by practicing orthopedists skilled in arthroscopic surgery is not practical.

A practical and preferred method of teaching and learning the required psychomotor skills is to provide a "hands-on" workshop wherein each student actually manipulates the arthroscope and the related instruments. However, a workshop approach toward learning operative arthroscopy of the knee requires a specimen into which the arthroscope and various operating instruments may be inserted. Actual human knee specimens obtained through amputations and the like are difficult to obtain in quantity for obvious reasons. Artificial knee models are available but are relatively expensive. In addition, such artificial knee models have not proven satisfactory for teaching arthroscopic surgical technique because they do not provide a realistic arthroscopic appearance, a realistic tactile sensation, or allow for continuous irrigation of the knee joint as would be utilized during actual surgery.

Accordingly, it is an object of the present invention to provide a model of the human knee that can be provided in large quantities for relatively little cost.

Another object of the present invention is to provide a model of the human knee that may be utilized to learn and develop the psychomotor skills required to perform arthroscopic surgery of the knee.

A further object of the present invention is to provide a model of a human knee into which an arthroscope may be inserted, the model providing a realistic arthroscopic appearance, realistic tactile sensation, and allowing for continuous irrigation of the knee joint.

The present inventor initially developed a human knee model which achieved the above stated objects of the present invention through a method of modifying a natural bovine knee and surrounding the modified bovine knee with a synethetic, flexible fluid impervious covering for allowing continuous irrigation of the knee joint. Through continued useage of and experimentation with the knee model initially developed, the present inventor has determined that, while the initial knee model is well suited for teaching arthroscopic surgical techniques, the natural cartilage, ligaments and other various tissues within the modified bovine knee joint are eventually cut away and destroyed following repeated uses of the knee model. Similarly, the synthetic covering surrounding the knee joint is typically punctured several times during each arthroscopic surgery training session and ultimately lacks sufficient integrity to irrigate the knee joint after the model has been used a number of times.

Of course, when a particular knee model has been used a number of times and has been depleted in the manner described above, it may simply be discarded in favor of a fresh, new knee model. However, the training facility or other user of the knee model must then store a number of replacement models, preferably in frozen storage to prevent decomposition of the knee joint. As the knee models are somewhat bulky due primarily to the portions of the bovine femur and tibia bones extending from the knee joint, a relatively large volume of frozen storage may be required to store an adequate supply of knee models. Furthermore, the shipping and packaging costs associated with such a relatively bulky knee model may become disadvantageously appreciable, particularly if such knee models are shipped by the manufacturer under refrigeration.

Furthermore, the knee model originally developed by the present inventor lacked an integral patella. The bovine knee joint includes a patella which is much larger than a human patella and which obstructs arthroscopic viewing of the interior of the knee joint. Thus, the quadriceps tendon was severed within the knee model originally developed by the present inventor for allowing the bovine patella to be removed to facilitate access of the arthroscope and surgical instruments within the interior of the knee joint. However, the lack of an integral patella in front of the knee joint lessens the ability of the knee model to accurately simulate the appearance of a human knee.

In addition, bovine knees supplied by meat packing houses are typically devoid of any muscle or other soft tissue around the femur or tibia bones. Consequently, attachment of the synthetic, flexible fluid-impervious covering over the knee joint results in the upper and lower ends of the covering being sealed directly against the femur and tibia bones, respectively. The external appearance of the covering surrounding the knee model consequently has a form which does not closely correspond to that of the skin surrounding a human knee.

Accordingly, it is an object of the present invention to provide a model of the human knee that may be utilized to learn and develop the psychomotor skills required to perform arthroscopic surgery of the knee and wherein the model may be easily and inexpensively renovated to its original condition following a series of repeated useages.

It is a further object of the present invention to provide such a human knee model providing a more realistic appearance by including a human-like patella and a more human-like external form.

These and other objects of the present invention will become apparent to those skilled in the art as the description thereof proceeds.

SUMMARY OF THE INVENTION

Briefly, and in accordance with one embodiment thereof, the present invention relates to a method of producing a human knee model suitable for learning and practicing arthroscopic surgical techniques, the method including the steps of providing a bovine knee and modifying the bovine knee to render the appearance of the knee more human-like and to facilitate insertion of an arthroscope into the knee joint. The method further includes the steps of surrounding the modified bovine knee with a synthetic, flexible fluid-impervious covering, such as heavy gauge vinyl, and sealing the covering above and below the knee joint for encasing the knee joint to allow continuous irrigation thereof.

In one embodiment of the present invention, the modification of the bovine knee includes the steps of cutting the femur and tibia bones at a distance of six to twelve inches from the knee joint to make the model more compact. In order to facilitate access to the knee joint, the bovine patella is removed, and the bovine fat pad and bovine patellar ligament are moved downwardly away from the knee joint. The ligamentous mucosa and the intrarticular septum are also removed. The trochlea at the lower extremity of the femur is modified by sawing it with a V-shaped cut to form a smaller trochlea having a shallower trochlear groove. The upper extremity of the tibia is also modified to remove the large tibial tubercle. The anterior cruciate ligament is severed to facilitate access to the tibial joint space, and the ligament of Wrisberg is also severed for allowing the lateral meniscus to be secured in proximity to the tibia. Lesions are created in the menisci of the knee, and loose bodies are added to the knee joint to simulate loose pieces of articular cartilage or bone.

In another embodiment of the present invention, the knee model is adapted to receive replaceable bovine knee joint inserts. Each replaceable insert is derived from a bovine leg having bovine femur and tibia bones and a bovine knee joint formed between the lower extremity of the bovine femur bone and the upper extremity of the bovine tibia bone. The bovine knee joint is modified generally in the above described manner to facilitate the insertion of an arthroscope therein. In addition, the bovine femur bone is severed closely proximate the lower extremity thereof, and the bovine tibia bone is severed closely proximate the upper extremity thereof, while the modified knee joint is allowed to remain intact. The replaceable bovine knee joint is positioned within the knee model by releasably securing the lower extremity of the bovine femur bone to a synthetic, upper support member and releasably securing the upper extremity of the bovine tibia bone to a synthetic, lower support member. Because the bovine femur and tibia bones are severed closely adjacent the knee joint, reformation of the trochlea and removal of the tibial tubercle may be omitted.

The knee model also includes a sealed synthetic, fluid-impervious covering surrounding the replaceable bovine knee joint as well as the portions of the upper and lower support members adjacent thereto for allowing continuous irrigation of the knee joint. The synthetic covering is preferably in the form of a plastic bag having an open upper end and a closed lower end, the closed lower end extending entirely around the lower support member and the upper end being guided upwardly over the knee model to extend about the upper support member. An elastic band or similar fastening device is used to seal the upper end of the bag against the upper support member.

To render the appearance of the knee model are human-like, the upper support member is formed to simulate the lower portion of a human femur bone, and the lower support member is formed to simulate the upper portion of a human tibia bone. A flexible strap extends between the simulated femur and tibia bones to maintain the same in alignment with one another during replacement of the bovine knee joint insert. A synthetic patellar ligament is secured at one end to the front of the simulated tibia bone and secured at its opposite end to a synthetic patella disposed in front of the knee joint insert. A synthetic quadriceps femoris tendon is secured at one of its ends to the synthetic patella and is secured at its opposite end to a guide; a track is formed within the simulated femur bone extending generally parallel to the longitudinal axis thereof, and the guide is engaged with the track for sliding movement therein to allow the knee model to be flexed and extended. Synthetic, sponge-like material is disposed about both the simulated femur bone and the simulated tibia bone to simulate the soft tissues normally surrounding such bones and to provide support for the sealed covering of the knee model.

BRIEF DESCRIPTION OF THE DRAWINGS

FIG. 1 is a perspective view of a model of the human knee made in accordance with a first embodiment of the present invention.

FIG. 2 is a perspective anterior view of a bovine leg including femur and tibia bones and a patella bone disposed adjacent the knee joint formed between the femur and tibia.

FIG. 3 is a perspective anterior view of the bovine knee joint shown in FIG. 2 after the petalla has been removed and the femur and tibia have been cut off above and below the knee joint, respectively.

FIG. 4 is a cross-sectional side view of the bovine knee joint prior to modification illustrating the location of the ligamentous mucosa.

FIG. 5 is an anterior view of the bovine knee joint illustrating the position of the ligamentous musoca and the intrarticular septum.

FIG. 6 is an anterior view similar to FIG. 5 wherein the ligamentous mucosa and the interarticular septum have been removed and where the patellar ligament and fat pad have been moved downwardly away from the knee joint.

DETAILED DESCRIPTION OF THE PREFERRED EMBODIMENTS

Figure 7:
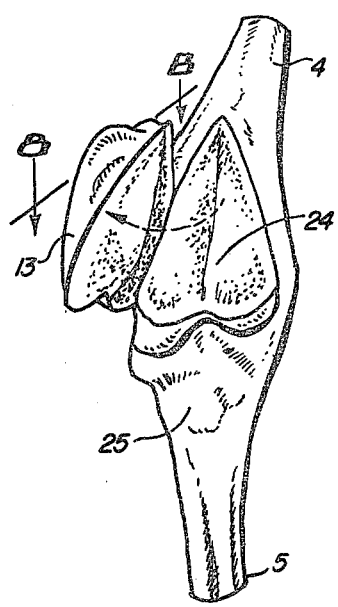
FIG. 7 is an anterior view of the bovine knee illustrating the removal of the enlarged trochlea and the formation of a new trochlear groove.

Bovine knees are readily available from meat packing houses at relatively little cost. However, the normal anatomy of the bovine knee precludes direct application of arthroscopic surgical techniques since the bovine knee differs from the human knee in several respects. The bovine knee is slightly larger than the human knee, is intrinsically more stable, and has a more limited range of motion. The tibial femoral joint appears to be located more posteriorly than in the human knee due to the presence of a huge patella and an enlarged, separate femoral trochlea. The fat pad within the bovine knee is enormous and obstructs arthroscopic viewing. The ligamentous mucosa is also relatively large and obstructs arthroscopic viewing. In addition, an intraarticular septum and an intraarticular tendon tend to cover the anterior aspect of the lateral femoral condyle, making entry of the arthroscope into the lateral joint compartment difficult. The lateral meniscus is maintained in close relationship with the lateral femoral condyle rather than the tibia due to a well-developed ligament of Wrisberg.

In FIG. 1, a human knee model, corresponding to a first embodiment of the present invention and designated generally by reference numeral 2, includes a modified bovine knee joint formed between the lower extremity of a bovine femur bone 4 and the upper extremity of a bovine tibia bone 5. The knee joint is encased in a heavy gauge vinyl bag 6 which is sealed above and below the knee joint at ends 7 and 8, respectively. The method by which the knee model illustrated in FIG. 1 is formed from a bovine knee is described below in a step-by-step manner as illustrated in FIGS. 2-19.

In FIG. 2, a right rear bovine leg is illustrated and includes a femur or thigh bone 4 and a tibia or shin bone 5. A petella or knee cap 10 is secured to tibia 5 by patellar ligament 11. The lower extremity of femur 4 includes a large pulley-like, grooved portion or trochlea 13 over which patella 10 glides when the knee joint is moved. The patella 10 is normally attached to a quadriceps femoris muscle (not shown) above trochlea 13 by a tendon 14 which has been severed in the view shown in FIG. 2.

FIG. 3 illustrates a modification of the bovine leg shown in FIG. 2 wherein patella 10 has been removed to provide access to the interior of the knee joint. Femur 4 and tibia 5 have been cut off with a bone saw approximately six to twelve inches from the knee joint to make the knee model more compact.

In FIG. 4, a cross-sectional side view of the bovine knee joint is shown to illustrate the position of the ligamentous mucosa 16 which extends from the anterior part of the knee joint to the area immediately below femur 4. The ligamentous mucosa is large and obstructs arthroscopic viewing of the bovine knee joint.

In FIG. 5, an anterior view of the knee joint illustrates the position of the ligamentous mucosa 16 as well as the position of the intraarticular septum 18. The intraarticular septum covers the front portion of the lateral femoral condyle (described below in reference to FIG. 6) and makes entry of the arthroscope into the lateral joint compartment difficult.

In FIG. 6, the bovine knee joint is shown after the ligamentous mucosa 16 and the intraarticular septum 18 have been removed. FIG. 6 reveals that the lower extremity of the femur includes two rounded bony emanances, the lateral femoral condyle 20 and the medial femoral condyle 21. FIG. 6 also illustrates the relatively large fat pad 22 which is normally disposed in front of the knee joint. As shown in FIG. 6, fat pad 22 and patellar ligament 11 have been moved downwardly away from the knee joint to facilitate access thereto by the arthroscope.

Figure 8:
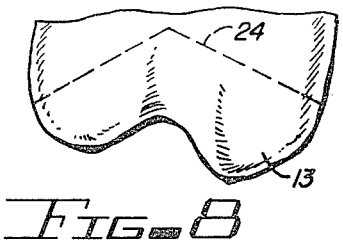
FIG. 8 is a top view of the trochlea illustrating the location of a V-shaped cut made therein.
Figure 9:
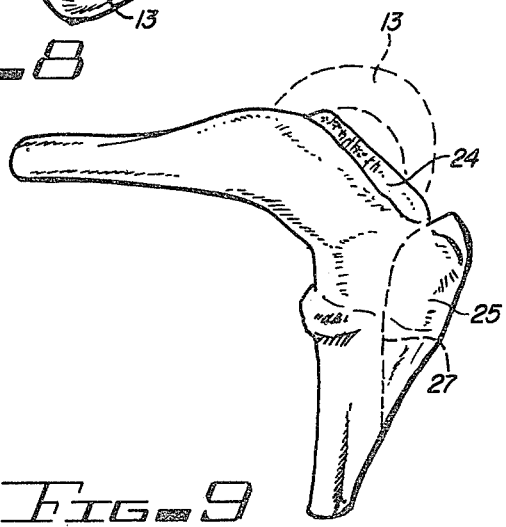
FIG. 9 is a side view of the bovine knee illustrating the reformed trochlear groove as well as a relatively large tibial tubercle adjacent the upper extremity of the tibia and the manner in which it is removed.

Referring to FIGS. 7-9, the relatively large trochlea portion 13 of the femur 4 is removed with a bone saw using a V-shaped cut to create a new, shallower trochlear groove 24 having a more human-like appearance. As shown best in FIGS. 7 and 9, tibia 5 includes a rough, rounded outgrowth or tubercle 25 extending from the upper anterior portion thereof. Tibial tubercle 25 is cut off with a bone saw along the path indicated by dashed lines 27 in FIG. 9 in order to render the appearance of the tibia more human-like.

Figure 10:
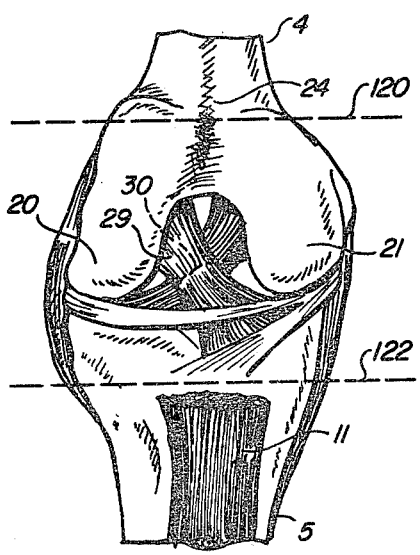
FIG. 10 is an enlarged anterior view of the bovine knee joint illustrating the position of the anterior cruciate ligament and the manner in which it is severed.
Figure 13:
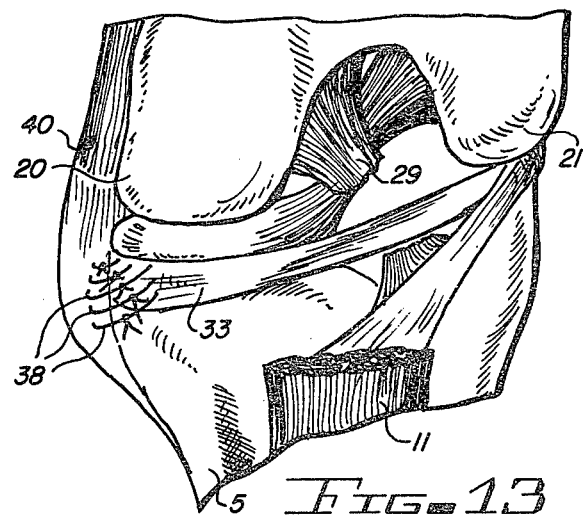
FIG. 13 is an enlarged anterior view of the bovine knee joint illustrating the manner in which the lateral meniscus is stabilized against the tibial plateau by sutures.

In FIG. 10, the knee joint is bent to expose the anterior cruciate ligament 29. Anterior cruciate ligament 29 is severed along dashed cut line 30 in order to open up the tibial joint space for facilitating the insertion of the arthroscope.

Figure 11:
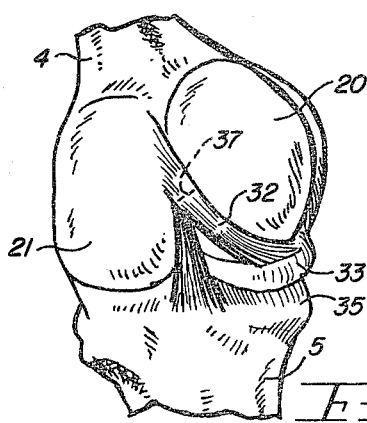
FIG. 11 is an enlarged posterior view of the bovine knee joint illustrating the position of the ligament of Wrisberg and the manner in which it is severed to free the lateral meniscus.
Figure 12:
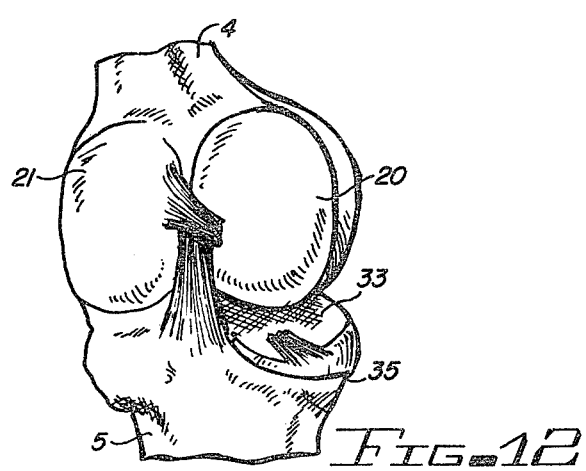
FIG. 12 is a view similar to FIG. 11 wherein the ligament of Wrisberg has been severed and the lateral meniscus has been lowered against the tibial plateau.

In the posterior view of the knee joint shown in FIG. 11, the ligament of Wrisberg 32 and lateral meniscus 33 are visible. Lateral meniscus 33 is held in close relationship with lateral femoral condyle 20 and away from the tibial plateau 35 by ligament of Wrisberg 32. In order to allow the lateral mensicus 33 to be displaced toward tibial plateau 35, ligament of Wrisberg 32 is severed through dashed line 37. The lateral meniscus 33 is then displaced downwardly onto tibial plateau 35 as shown in FIG. 12. In order to stabilize lateral meniscus 33 after ligament of Wrisberg 32 is severed, the outer periphery of lateral meniscus 33 is secured by sutures 38 either to the lateral colateral ligament 40, as shown in the anterior view of FIG. 13, or to the periosteum, the membrane which covers the surface of the tibia below the tibial plateau.

Figure 14:
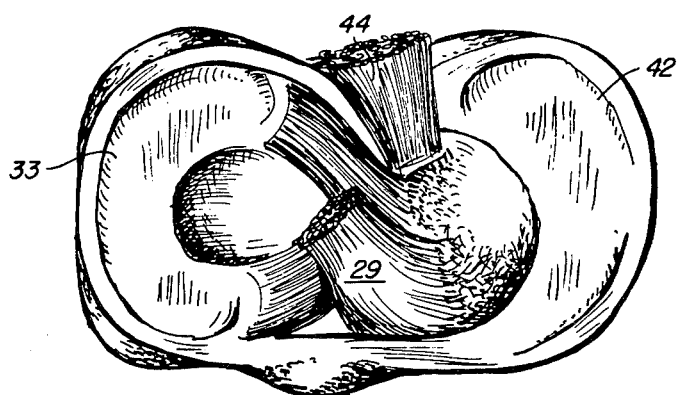
FIG. 14 is a top view of the lateral meniscus and medial meniscus in their normal condition.

In FIG. 14, a top view of the knee joint is illustrated from a point immediately below the femur in order to illustrate the lateral meniscus 33 and the medial meniscus 42. The menisci 33 and 42, also known as semi-lunar cartilages, are each crescent-shaped fibrocollagenous structures positioned between the tibial plateau and the knuckle-like femoral condyles. The menisci exert a strong stabilizing effect on the joint by deepening the socket into which the femoral condyles fit. Also visible in FIG. 14 are the lower portions of the anterior cruciate ligament 29 and the posterior cruciate ligament 44.

The menisci 33 and 42 may become torn due to forcible rotation or twisting of the weight-bearing knee. Tearing may occur longitudinally within the body of a meniscus forming a split of the tissue, one side of which extends into the intercondylar space of the joint. This type of tear is commonly known as a bucket-handle tear. Tearing may also occur at the posterior and anterior ends (or horns) of a meniscus.

Figure 15:
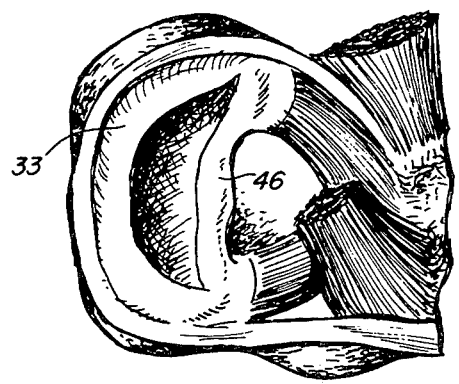
FIG. 15 is a top view of the lateral meniscus wherein a bucket handle tear has been created therein.
Figure 16:
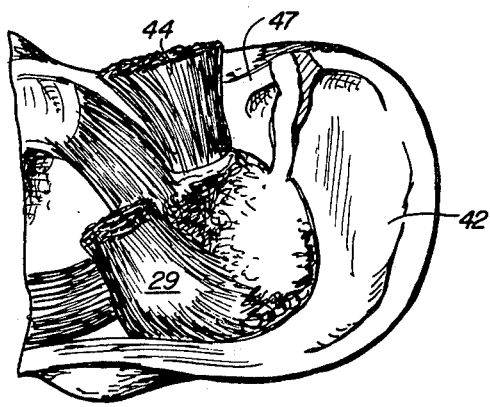
FIG. 16 is a top view of the medial meniscus wherein a tear has been created in the posterior horn thereof.

In order to simulate such injuries within the knee model, lesions may be created within the lateral meniscus 33 and medial meniscus 42 of the bovine knee joint. In FIG. 15, a bucket-handle tear has been created within the lateral meniscus 33, and split tissue portion 46 of the lateral meniscus extends into the intercondylar space. In FIG. 16, a tear has been created in the posterior horn 47 of the medial meniscus 42. In addition, loose bodies can be added to the modified bovine knee joint to simulate various other injuries to the knee. Such loose bodies may include actual or artificial pieces of articular cartilage and bone.

Figure 17:
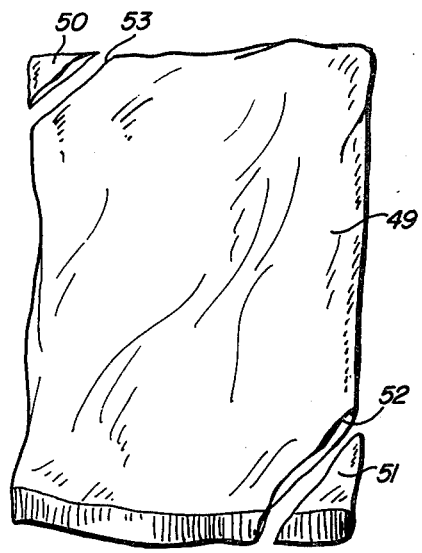
FIG. 17 illustrates a heavy gauge vinyl bag which has been cut at opposing corners.
Figures 18, 19:
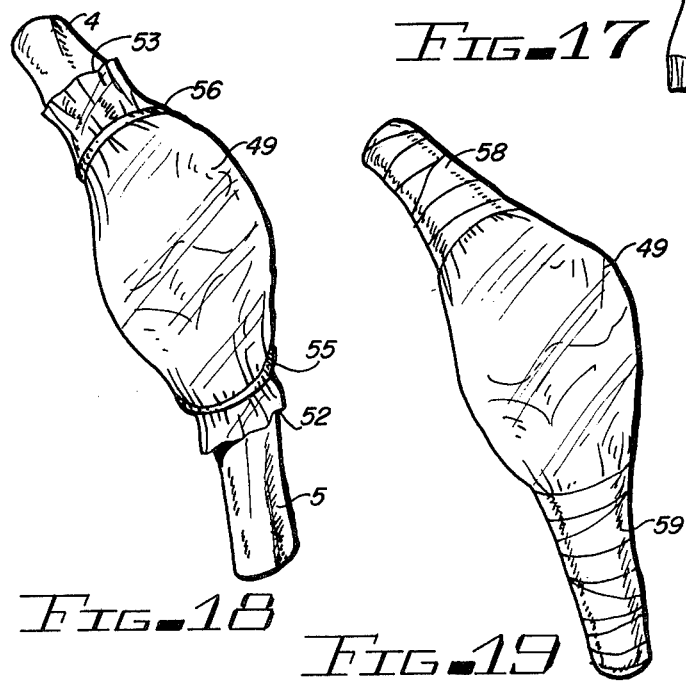
FIG. 18 is a perspective view of the modified bovine knee joint wherein the vinyl bag shown in FIG. 17 has been inserted over the knee joint.
FIG. 19 is a perspective view of the knee model and illustrating the manner in which the ends of the vinyl bag are sealed to the bovine femur and tibia bones.

FIG. 17 illustrates a heavy gauge vinyl bag of the type which may be used to encase the modified bovine knee for allowing continuous irrigation thereof. The opposing corners 50 and 51 of bag 49 are diagonally cut to provide openings for allowing bag 49 to be inserted over the knee joint. The opening provided by cutting away corner 51 is passed over the end of femur 4 and pulled downwardly over the knee joint and over tibia 5. The opening 53 created by cutting away corner 50 is guided over the end of femur 4. Vinyl bag 49 is held in place relative to the knee joint by securing the ends of the bag adjacent openings 52 and 53 to the tibia 5 and femur 4 with rubber bands 55 and 56, respectively. The ends of bag 49 are then sealed against femur 4 and tibia 5 with overlapped layers of reinforced packaging tape 58 and 59. Seals 58 and 59 allow the knee model to be continuously irrigated wherein a steady and continuous stream of water or medicinal solution can flow within bag 49 around the knee joint to continuously wash away loose matter.

Figure 20:
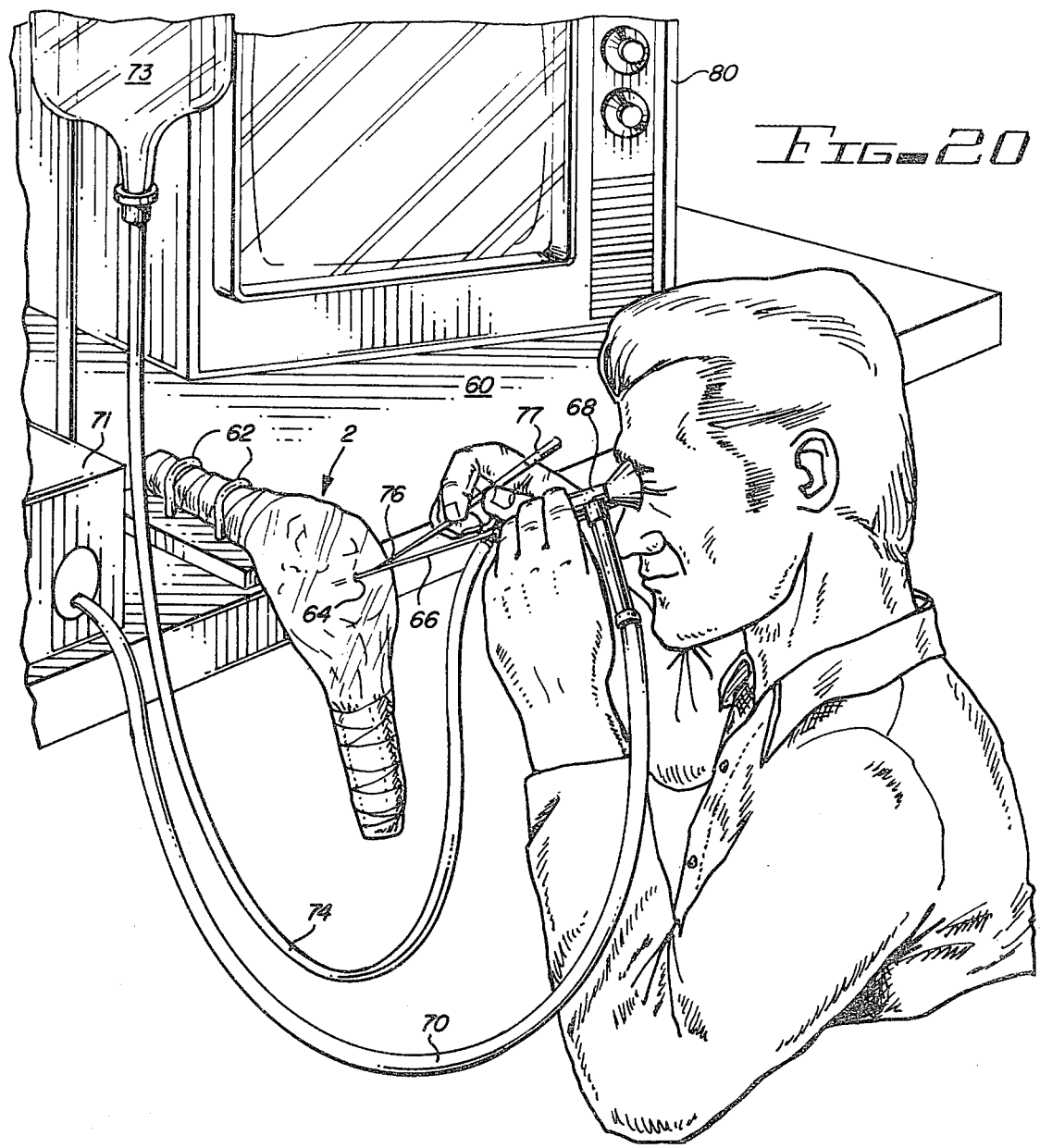
FIG. 20 illustrates the manner in which the knee model of FIG. 1 is utilized for teaching arthroscopic surgical techniques.

FIG. 20 illustrates the manner in which the human knee model shown in FIG. 1 is utilized to teach arthroscopic surgical techniques. The knee model 2 is clamped to a work bench or table 60 as by clamp 62 which rigidly holds the femur end of the model. The tibia end of the model may then be manipulated during arthroscopy in order to apply angular and rotary stress to the knee joint. A first incision 64 is made in the vinyl cover with a trochar, and water sleeve 66 is inserted therethrough for accessing the knee joint. An arthroscope 68 is inserted into water sleeve 66 in a known manner. Fiber optic cable 70 is coupled to a light source 71 for conducting light to arthroscope 68 in order to illuminate the area of the knee joint to be viewed. A suspended irrigation bag 73 is coupled by irrigation tubing 74 to arthroscope 68 for directing water into water sleeve 66 which, in turn, continuously washes the area of the knee joint viewed by arthroscope 68. A second incision (not shown) is made within the vinyl cover with a trochar for establishing outflow counterdrinage of the irrigating fluid. A third incision 76 is made in the vinyl cover with a trochar, and a manual instrument 77 is inserted therethrough. The surgeon then directs the tip of manual instrument 77 toward the area being viewed by arthroscope 68, either by direct viewing through the arthroscope (as shown in FIG. 20) or by connecting a video camera (not shown) to arthroscope 68 and viewing the image on television screen 80. Other manual instruments can be inserted through second incision 76 to practice the technique of triangulation and to develop the psychomotor skills necessary for successful operative arthroscopy. Powered operating instruments of the type utilizing a suction system and requiring that the knee joint be continuously irrigated may also be used in conjunction with the present knee model.

When not in use, the knee model is maintained in frozen storage. When the model is again to be used, it can be thawed in several minutes, either by letting it stand at room temperature or immersing it in running water. The knee model can be re-frozen and re-thawed repeatedly without resulting in significant deterioration. When the knee model is shipped, it is packaged in dry ice to maintain the knee model in frozen condition.

Figure 21:
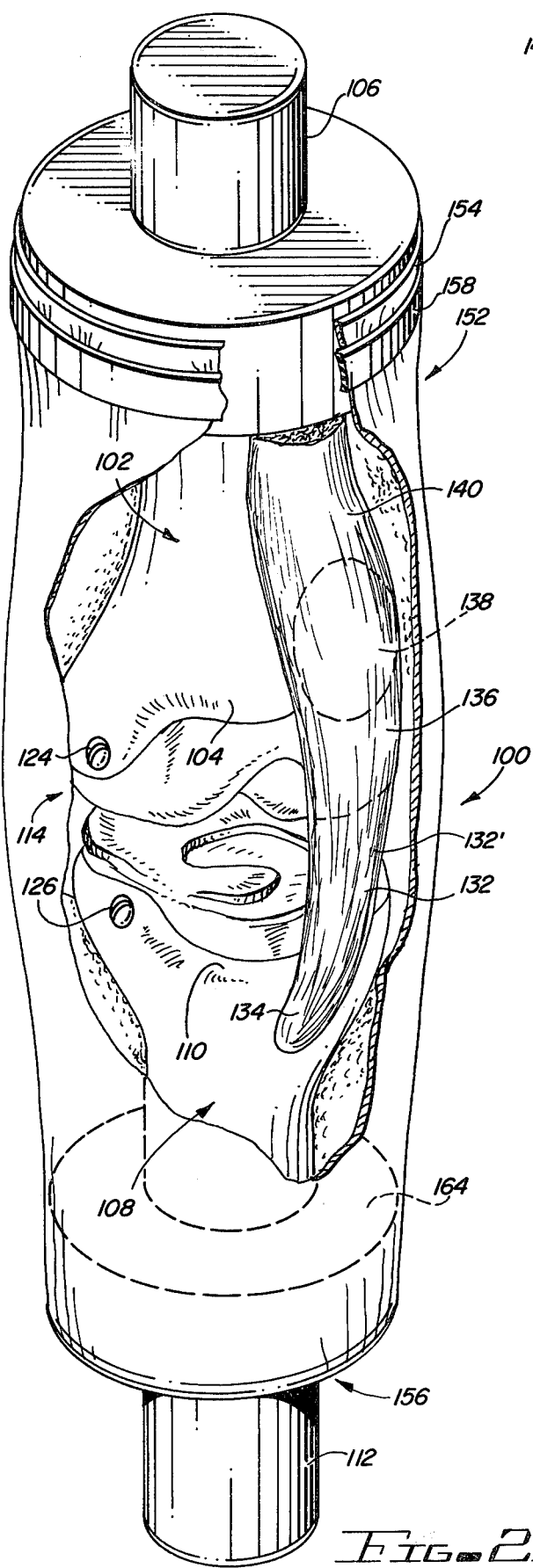
FIG. 21 is a perspective, partially cutaway view of a model of the human knee made in accordance with a second embodiment of the present invention adapted to utilize replaceable bovine knee joint inserts and provided with synthetic femur and tibia bone portions as well as a synthetic patella.

Referring now to FIG. 21, a second embodiment of the present invention is illustrated wherein the knee model is adapted to interchangeably receive replaceable bovine knee joint inserts and wherein a synthetic knee cap assembly is added to the model to more closely simulate a human knee. The knee model, designated generally by reference numeral 100 within FIG. 21, includes a synthetic femur bone member 102 having a lower end portion 104 and an upper end portion 106. Synthetic femur bone 102 is preferably made of a relatively hard plastic material and is shaped to simulate the appearance of the lower portion of a human femur bone. Knee model 100 further includes a synthetic tibia bone member 108 having an upper end 110 and a lower end 112. Synthetic tibia bone 108 is also preferably made of a hard plastic and is shaped to simulate the appearance of the upper portion of a human tibia bone.

Figure 22:
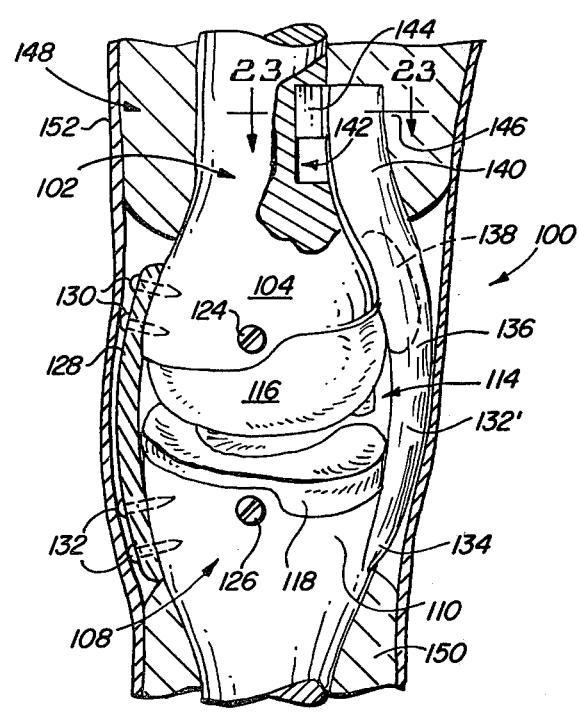
FIG. 22 is a cutaway side view of the knee model shown in FIG. 21 illustrating a synthetic patellar ligament, synthetic quadriceps femoris tendon and a track formed within the synthetic femur bone within which a guide secured to the quadriceps femoris tendon is slidingly engaged.

Referring to FIGS. 21 and 22, knee model 100 is adapted to releasably receive a modified bovine knee joint insert, designated generally within the figures by reference numeral 114. The method used to prepare knee joint insert 114 is essentially similar to the method described above with regard to FIGS. 1-16. As before, the bovine quadriceps femoris tendon 14 (see FIG. 2) is severed, and the bovine patella 10 is removed. The ligamentous mucosa and intraarticular septum are also removed, as described above with regard to FIGS. 4 and 5. Fat pad 22 (see FIG. 6) is either moved downwardly away from the knee joint or removed altogether.

Further modification of the bovine knee joint to facilitate insertion of the arthorscope entails severing the anterior cruciate ligament 29, as shown in FIG. 10, and severing the ligament of Wrisberg 32, as shown in FIGS. 11 and 12. Lateral meniscus 33 is then displaced downwardly onto tibial plateau 35 and stabilized, in the manner described above with reference to FIGS. 12 and 13. Also, lesions may be created within the lateral meniscus 33 and medial meniscus 42 of the bovine knee joint, as described above with reference to FIGS. 15 and 16; loose bodies may also be added to the modified bovine knee joint to simulate other injuries to the knee, as described above.

Either before or after preparing the modified bovine knee joint in the manner described above to facilitate the insertion of an arthroscope therein, the bovine femur and tibia bones are severed, as with a bone saw, closely proximate the lower extremity of the bovine femur bone and the upper extremity of the bovine tibia bone, care being taken not to sever the ligaments and other tissues left intact within the knee joint following the modification procedure already described above. The resulting modified bovine knee joint 114, as shown in FIGS. 21 and 22, includes the lower extremity 116 of the bovine femur bone and the upper extremity 118 of the bovine tibia bone, together with the modified bovine knee joint therebetween. Referring briefly to FIG. 10, the bovine femur bone 4 may be severed immediately above the lateral (external) femoral condyle 20 and the medial (internal) femoral condyle 21, as indicated by dashed line 120. Similarly, the bovine tibia bone may be severed immediately below the head of the bovine tibia bone, as indicated by dashed line 122 within FIG. 10. Accordingly, the previously described steps of reforming the bovine trochlea portion 13 (see FIG. 7) and removing the tibial tubercle 25 (see FIGS. 7 and 9) are not required as these portions of the bovine femur and tibia bones are not incorporated within the modified knee joint insert.

Still referring to FIGS. 21 and 22, the lower end 104 of synthetic femur bone 102 is hollowed out and is slightly larger in diameter than lower extremity 116 of the bovine femur bone for supportingly receiving lower extremity 116. Similarly, upper end 110 of synthetic tibia bone 108 is also hollowed out and of a somewhat larger diameter than upper extremity 118 of the bovine tibia bone to supportingly receive upper extremity 118. In addition, the front portion of lower end 104 of synthetic femur bone 102 is raised above the rear portion thereof, and the front portion of upper end 110 of synthetic tibia bone 108 is lowered below the rear portion thereof for allowing bovine knee joint insert 114 to be easily and conveniently inserted therebetween from the front portions thereof. Also, as shown in FIGS. 21 and 22, retaining screws 124 and 126 extend through holes drilled within synthetic femur bone 102 and synthetic tibia bone 108 for engaging corresponding holes drilled within lower extremity 116 of the bovine femur bone and upper extremity 118 of the bovine tibia bone, respectively, for releasably securing modified bovine knee joint insert 114 thereto. Thus, synthetic femur bone 102 and synthetic tibia bone 108 serve as upper and lower support members, respectively, for supporting the modified bovine knee joint within the knee model.

With reference to FIG. 22, a flexible hinge strap 128 is secured at its uppermost end to the rear portion of synthetic femur bone 102, as by screws 130. The lower end of hinge strap 128 is secured to the rear portion of synthetic tibia bone 108, as by screws 132. The function of hinge strap 128 is to maintain synthetic femur bone 102 and synthetic tibia bone 108 in proper alignment with one another during replacement of modified bovine knee joint insert 114. Hinge strap 128 is sufficient flexible to avoid any intereference with articulation of the knee joint.

To further simulate the actual appearance of a human knee, human knee model 100 includes a knee cap assembly extending downwardly across the front portion of the knee joint. As shown in FIGS. 21 and 22, a synthetic patellar ligament 132 has a lower end 134 secured to the front portion of the upper end of synthetic tibia bone member 110. Synthetic patellar ligament 132 also has an upper end 136 secured in overlying relationship with a synthetic patella or knee cap 138. Patella 138 is preferably made of a hard plastic material similar to that used to form synthetic femur and tibia bone members 102 and 108, respectively, and is shaped to simulate a patella within the human knee. Patellar ligament 132 is preferably formed from a relatively soft and somewhat flexible plastic material. Patella 138 is also coupled to the lower end of a synthetic, simulated quadriceps femoris tendon 140.

Figure 23:
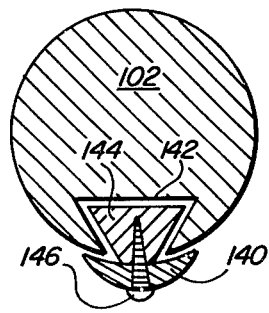
FIG. 23 is a cross-sectional view of the track formed within the synthetic femur bone and the guide engaged therewith taken through the plane designated by lines 23—23 shown in FIG. 22.

With reference to FIGS. 22 and 23, a mechanism is provided for coupling the upper end of synthetic tendon 140 to the front portion of synthetic femur bone 102 whereby the knee model may be freely articulated between flexed and extended positions. As shown in FIGS. 22 and 23, synthetic femur bone 102 has a track 142 formed in the front portion thereof and extending generally parallel to its longitudinal axis. As shown best in FIG. 23, track 142 is preferably formed as a dovetail-shaped mortise. A guide 144, preferably a dovetail-shaped tenon, is secured to the rear portion of synthetic tendon 140 adjacent the upper end thereof by screw 146. Guide 144 is engaged with track 142 for sliding movement therealong. When the knee model is bent or flexed, then guide 144 slides toward the lower end of track 142. When the knee model is straightened or extended, then guide 144 moves toward the upper end of track 142. As the knee joint of the knee model is flexed and extended, synthetic patella 138 moves along a trochlea molded within the lower end 104 of synthetic femur bone 102 proximate the front portions thereof. The movement of patella 138 across the aforementioned trochlea simulates the actual movement of a human patella 138 during flexion and extension of the human knee. By temporarily removing screw 146, synthetic tendon 140 may be detached from guide 144 for allowing synthetic tendon 140 and synthetic patellar ligament 132 to be displaced downwardly for facilitating the removal and subsequent replacement of the modified bovine knee joint insert.

As shown in FIG. 22, the knee model may be given a more realistic form if the synthetic femur bone 102 and synthetic tibia bone 108 are surrounded by materials simulating the soft tissues actually surrounding the human knee joint. Accordingly, a mass of synthetic sponge-like material 148, preferably made of soft plastic, surrounds synthetic femur bone 102, with the exception of the volume occupied by synthetic tendon 140 to avoid intereference therewith. Similarly, a mass of synthetic sponge-like material 150 surrounds the synthetic tibia bone 108. Synthetic masses 148 and 150 not only simulate the form of soft tissue actually surrounding the femur and tibia bones within a human knee but also provide additional support for a skin-like covering over the knee model, as will be described in further detail below.

Figure 24:
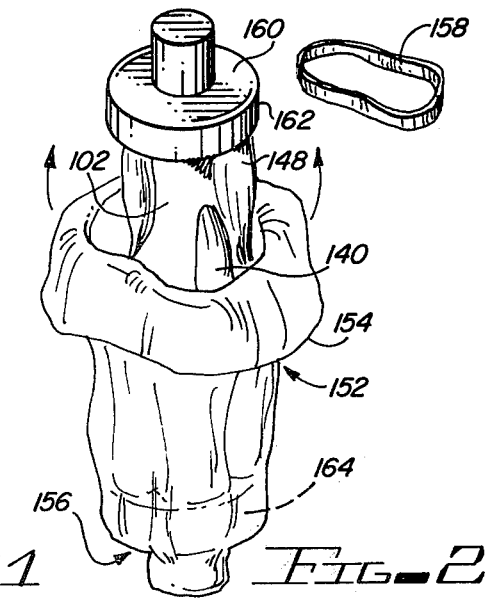
FIG. 24 is a perspective view of the knee model shown in FIG. 21 and illustrating the manner in which a plastic bag having an open upper end is guided upwardly over the knee model to provide a fluid-impervious covering encasing the knee joint and to simulate the skin covering a human knee.

Referring to FIGS. 21 and 22, the knee model includes a synthetic, flexible, fluid-impervious covering which, in the preferred embodiment of the present invention has the form of a heavy gauge plastic bag 152 having an open upper end 154 and a closed lower end, designated generally by reference numeral 156. As shown best in FIGS. 21 and 24, closed lower end 156 of synthetic bag 152 extends entirely around the lower end of the knee model and encases synthetic tibia bone 108. The upper portion of synthetic bag 152 surrounds the modified bovine knee joint and surrounds at least the lower portion of synthetic femur bone 102. As shown in FIG. 24, synthetic bag 152 is installed by guiding open end 154 of the bag upwardly past the modified bovine knee joint insert and around synthetic tibia bone 102 and the mass of sponge-like material 148 disposed thereover. An elastic band 158 is used to seal upper end 154 of synthetic bag 152 against the upper portion of the knee model. Referring to FIG. 24, a relatively hard plastic disk 160 is secured over the upper end of synthetic femur bone 102, and the upper end 154 of synthetic bag 152 may be sealed against the cylindrical edge 162 of disk 160 to ensure a leak-proof seal therebetween. A similar disk 164 is preferably secured around the lower end of synthetic tibia bone 108 to aid in maintaining a human-like appearance of the portion of the knee model surrounding the knee joint.

Synthetic bag 152 simulates the skin surrounding a human knee and is preferably made opaque to hide the modified bovine knee joint 114 from direct viewing, forcing the surgeon in training to rely solely upon the arthroscope for viewing of the knee joint. In addition, synthetic bag 152 surrounds the knee joint with a fluid-impervious covering for allowing the knee joint to be continuously irrigated in a manner described above. When the integrity of synthetic bag 152 is diminished through repeated uses of the knee model, elastic band 158 is removed and bag 152 is pulled downwardly away from the knee model and replaced by a new synthetic bag.

Those skilled in the art will now appreciate that a human knee model and a method for making such a model, have been described wherein the knee model is advantageously adapted to allow surgeons to learn and practice the skills required to perform arthroscopic surgery of the knee. The actual bovine tissue within the knee model provides a realistic arthroscopic appearance as well as a realistic tactile sensation. The cover encasing the knee joint simulates the skin covering a human knee and allows for continuous irrigation of the knee as performed under actual operating conditions. The knee model can be provided relatively inexpensively in large quantities, and each knee model may be used repetitively. Moreover, by fashioning the knee model to accept replaceable bovine knee joint inserts and to use a replaceable synthetic bag covering, the model can be easily and inexpensively renovated to its original condition. Furthermore, the use of replaceable inserts saves significantly on packing, shipping, and storage costs associated with such knee models. The synthetic patella, patellar ligament and quadriceps femoris tendon simulate those within a human knee and cause the surgeon using the model to position his or her arthrscope and surgical tools with proper respect relative thereto. The sliding coupling effected between the quadriceps femoris tendon and the synthetic femur bone allows the knee model to be flexed while maintaining the synthetic patella in proper position with respect to the knee joint. The masses of sponge-like material surrounding the synthetic femur and tibia bones give a more human-like form to the knee model and aid in supporting the skin-like covering over the model.

While the invention has been described with reference to preferred embodiments thereof, the description is for illustrative purposes only and is not to be construed as limiting the scope of the invention. Various modifications and changes may be made by those skilled in the art without departing from the true spirit and scope of the invention as defined by the appended claims.

I claim:

1. A method of producing a model of the human knee having a replaceable knee joint, the model being suitable for learning and practicing arthroscopic surgical techniques, said method comprising the steps of:
   a. providing a bovine leg having femur and tibia bones, the femur and tibia bones having a lower extremity and an upper extremity, respectively, the bovine leg including a knee joint formed between the lower extremity of the femur bone and the upper extremity of the tibia bone;
   b. modifying the knee joint of the bovine leg to facilitate the insertion of an arthroscope into the knee joint;
   c. severing the bovine femur and tibia bones closely proximate the lower and upper extremities, respectively, thereof while leaving the modified knee joint intact;
   d. releasably securing the lower extremity of the severed bovine femur bone to the lower end of an upper support member, and releasably securing the upper extremity of the severed bovine tibia bone to the upper end of a lower support member;

e. surrounding the modified knee joint and at least the upper and lower ends of the lower and upper support members, respectively, with a synthetic flexible, fluid-impervious covering; and f. sealing the covering to allow continuous irrigation of the knee joint.

2. A method as recited by claim 1 wherein the lower extremity of the bovine femur bone includes external and internal condyles and wherein said severing step includes the step of cutting the bovine femur bone immediately above the external and internal condyles.

3. A method as recited in claim 1 wherein the upper extremity of the bovine tibia bone includes a head portion having a tibial plateau and wherein said severing step includes the step of cutting the bovine tibia bone immediately below the head portion thereof.

4. A method as recited by claim 1 wherein the bovine leg includes a bovine patella disposed in front of the knee joint, and wherein said modifying step includes the step of removing the bovine patella.

5. A method as recited by claim 1 wherein the bovine knee joint includes a ligamentous mucosa and intraarticular septum, and wherein said modifying step includes the step of removing the ligamentous mucosa and the intraarticular septum to facilitate access into the knee joint by an arthroscope.

6. A method as recited by claim 1 wherein the bovine leg includes a bovine fat pad and a bovine patellar ligament disposed proximate to the knee joint, and wherein said modifying step includes the step of moving the bovine fat pad and the bovine patellar ligament away from the knee joint.

7. A method as recited by claim 1 wherein the bovine knee joint includes an anterior cruciate ligament, and wherein said modifying step includes the step of severing the anterior cruciate ligament to facilitate access to the knee joint by an arthroscope.

8. A method as recited by claim 1 wherein the lower extremity of the bovine femur bone includes a laterial condyle and wherein the bovine knee joint includes a lateral meniscus disposed between the lateral condyle and the upper extremity of the bovine tibia bone, the bovine knee joint also including a well-developed ligament of Wrisberg tending to hold the lateral meniscus in close relationship with the lateral condyle, and wherein said modifying step includes the step of severing the ligament of Wrisberg to allow the lateral meniscus to be displaced toward the upper extremity of the bovine tibia bone.

9. A method as recited by claim 8 wherein said modifying step further includes the step of securing the lateral meniscus in close proximity to the upper extremity of the bovine tibia bone.

10. A method as recited by claim 1 wherein the bovine knee joint includes a lateral meniscus and a medial meniscus disposed between the bovine femur and tibia bones, and wherein said modifying step includes the step of creating lesions in the lateral meniscus and in the medial meniscus for simulating injuries within a human knee joint.

11. A method as recited by claim 1 further including the step of adding loose bodies within the knee joint prior to said surrounding step for simulating loose pieces of articular cartilage and bone within a human knee joint.

12. A method as recited by claim 1 wherein the flexible covering as heavy gauge plastic.

13. A method as recited by claim 1 wherein the flexible covering is a synthetic bag having an open upper end, and wherein said surrounding step includes the steps of guiding the open end of the bag upwardly past the knee joint and around the upper support member, and wherein said sealing step includes the step of sealing the open end of the bag.

14. A knee model for teaching psychomotor skills required for arthroscopic surgery and having a replaceable knee joint, said knee model comprising in combination:

a. an upper support member having a lower end;

b. a lower support member having an upper end;

c. a bovine knee joint modified to facilitate the insertion of an arthroscope therein, said modified bovine knee joint including the lower extremity of a bovine femur bone and the upper extremity of a bovine tibia bone;

d. means for releasably securing the lower extremity of the bovine femur bone to the lower end of said upper support member and for releasably securing the upper extremity of said bovine tibia bone to the upper end of said lower support member for removably positioning said modified bovine knee joint between said upper and lower support members; and e. a synthetic, flexible, fluid-impervious sealed covering surrounding said modified bovine knee joint and surrounding at least the lower and upper ends of said upper and lower support members, respectively, for simulating skin surrounding a human knee and for allowing continuous irrigation of the modified bovine knee joint.

15. A knee model as recited in claim 14 wherein said covering is made of heavy gauge plastic.

16. A knee model as recited by claim 15 wherein said sealed covering is in the form of a bag having an open upper end and a closed lower end, said closed lower end being disposed entirely around said lower support member, and said open upper end being disposed about said upper support member, said sealed covering further including sealing means for sealing the open upper end of said bag against said upper support member.

17. A knee model as recited by claim 16 wherein:

a. said upper support member includes a synthetic femur bone member simulating the appearance of the lower portion of a human femur bone, said femur bone member having a lower end adapted to be releasably secured to the lower extremity of said bovine femur bone; and b. said lower support member includes a synthetic tibia bone member simulating the appearance of the upper portion of a human tibia bone, said tibia bone member having an upper end adapted to be releasably secured to the upper extremity of said bovine tibia bone.

18. A knee model as recited by claim 17 further including a flexible strap secured to the lower end of said femur bone member and to the upper end of said tibia bone member for maintaining said femur bone member and said tibia bone member in alignment with one another during replacement of said modified bovine knee joinet.

19. A knee model as recited by claim 17 further including:

a. a synthetic patellar ligament having upper and lower ends, the lower end of said synthetic patellar ligament being secured to said tibia bone member;

a. a synthetic patella secured to the upper end of said synthetic patellar ligament;
c. a synthetic quadriceps femoris tendon having upper and lower ends, the lower end of said synthetic quadriceps femoris tendon being secured to said patella; and
d. coupling means for coupling the upper end of said synthetic quadriceps femoris tendon to said femur bone member.

20. A knee model as recited by claim 19 wherein said tibia bone member has a longitudinal axis and wherein said coupling means comprises:
a. a track formed within said femur bone member and extending generally parallel to the longitudinal axis thereof; and
b. a guide secured to the upper end of said synthetic quadriceps femoris tendon and engaged with said track for sliding movement therein to allow the knee model to be flexed and extended.

21. A knee model as recited by claim 17 wherein:
. said upper support member includes a mass of synthetic sponge-like material disposed about said femur bone member to simulate the form of soft tissue surrounding a human femur bone and to provide support for said sealed covering; and
b. said lower support member includes a mass of synthetic sponge-like material disposed about said tibia bone member to simulate the form of soft tissue surrounding a human tibia bone and to provide support for said sealed covering.

22. A knee model for teaching psychomotor skills required for arthroscopic surgery and having a replaceable knee joint, said knee model being produced by a method comprising the steps of:
a. providing a bovine leg having femur and tibia bones, the femur and tibia bones having a lower extremity and an upper extremity, respectively, the bovine leg including a knee joint formed between the lower extremity of the femur bone and the upper extremity of the tibia bone;
b. modifying the knee joint of the bovine leg to facilitate the insertion of an arthroscope into the knee joint;
c. severing the bovine femur and tibia bones closely proximate the lower and upper extremities, respectively, thereof while leaving the modified knee joint intact;
d. releasably securing the lower extremity of the severed bovine femur bone to the lower end of an upper support member, and releasably securing the upper extremity of the severed bovine tibia bone to the upper end of a lower support member;
e. surrounding the modified knee joint and at least the upper and lower ends of the lower and upper support members, respectively, with a synthetic flexible, fluid-impervious covering; and
f. sealing the covering to allow continuous irrigation of the knee joint.

23. A knee model as recited by claim 22 wherein the lower extremity of the bovine femur bone includes external and internal condyles and wherein said severing step includes the step of cutting the bovine femur bone immediately above the external and internal condyles.

24. A knee model as recited by claim 22 wherein the upper extremity of the bovine tibia bone includes a head portion having a tibial plateau and wherein said severing step includes the step of cutting the bovine tibia bone immediately below the head portion thereof.

25. A knee model as recited by claim 22 wherein the bovine leg includes a bovine patella disposed in front of the knee joint, and wherein said modifying step includes the step of removing the bovine patella.

26. A knee model as recited by claim 22 wherein the bovine knee joint includes a ligamentous mucosa and an intraarticular septum, and wherein said modifying step includes the step of removing the ligamentous mucosa and the intraarticular septum to facilitate access into the knee joint by an arthroscope.

27. A knee model as recited by claim 22 wherein the bovine leg includes a bovine fat pad and a bovine patellar ligament disposed proximate to the knee joint, and wherein said modifying step includes the step of moving the bovine fat pad and the bovine patellar ligament away from the knee joint.

28. A knee model as recited by claim 22 wherein the bovine knee joint includes an anterior cruciate ligament, and wherein said modifying step includes the step of severing the anterior cruciate ligament to facilitate access to the knee joint by an arthroscope.

29. A knee model as recited by claim 22 wherein the lower extremity of the bovine femur bone includes a lateral condyle and wherein the bovine knee joint includes a lateral meniscus disposed between the lateral condyle and the upper extremity of the bovine tibia bone, the bovine knee joint also including a well-developed ligament of Wrisberg tending to hold the lateral meniscus in close relationship with the lateral condyle, and wherein said modifying step includes the step of severing the ligament of Wrisberg to allow the lateral meniscus to be displaced toward the upper extremity of the bovine tibia bone.

30. A knee model as recited by claim 29 wherein said modifying step further includes the step of securing the lateral meniscus in close proximity to the upper extremity of the bovine tibia bone.

31. A knee model as recited by claim 22 wherein the bovine knee joint includes a lateral meniscus and a medial meniscus disposed between the bovine femur and tibia bones, and wherein said modifying step includes the step of creating lesions in the lateral meniscus and in the medial meniscus for simulating injuries within a human knee joint.

32. A knee model as recited by claim 22 further including the step of adding loose bodies within the knee joint prior to said surrounding step for simulating loose pieces of articular cartilage and bone within a human knee joint.

33. A knee model as recited by claim 22 wherein the flexible covering is heavy gauge plastic.

34. A knee model as recited by claim 22 wherein the flexible covering is a synthetic bag having an open upper end, and wherein said surounding step includes the steps of guiding the open end of the bag upwardly past the knee joint and around the upper support member, and wherein said sealing step includes the step of sealing the open end of the bag.

* * * * *